Jan. 8, 1935.  J. RAZEK ET AL  1,987,539
ELECTRICAL SYSTEM
Filed Jan. 10, 1933  2 Sheets-Sheet 1

Inventors:
Joseph Razek
Peter J. Mulder
by their Attorneys
Howson & Howson

Jan. 8, 1935.   J. RAZEK ET AL   1,987,539
ELECTRICAL SYSTEM
Filed Jan. 10, 1933    2 Sheets-Sheet 2

Inventors:
Joseph Razek
Peter J. Mulder
by their Attorneys
Howson & Howson

Patented Jan. 8, 1935

1,987,539

UNITED STATES PATENT OFFICE 1,987,539

ELECTRICAL SYSTEM

Joseph Razek, Upper Darby, and Peter J. Mulder, Drexel Hill, Pa., assignors to Thwing Instrument Company, Philadelphia, Pa., a corporation of Pennsylvania Application January 10, 1933, Serial No. 651,054

11 Claims. (Cl. 171—95)

This invention relates generally to methods and apparatus for producing a fluctuating voltage corresponding to a unidirectional voltage, and more particularly to methods and apparatus for amplifying and/or measuring a low amplitude, unidirectional voltage.

A general object of the invention is to provide a novel method and apparatus for producing a fluctuating voltage corresponding to a unidirectional voltage or to the resultant of a plurality of such voltages.

A more specific object of the invention is to provide a novel method and apparatus for efficiently amplifying and/or measuring low amplitude, unidirectional voltages.

Another object of this invention is to provide a method and apparatus for the above-stated purpose which involves the production of a fluctuating voltage corresponding to a low amplitude, unidirectional voltage without using mechanically moving elements that have certain disadvantages, such as the wearing of parts, etc.

A further object of the invention is to provide a simple method and apparatus for amplifying and/or measuring low amplitude, unidirectional voltages, such as are encountered in the use of thermocouples, etc.

Although it is applicable generally to various instances in which it may be desired to produce a fluctuating voltage corresponding to a low amplitude, unidirectional voltage, the invention is particularly useful in connection with the "millivolt meter" method of measuring temperature variations. Such method makes use of a thermocouple which generates low amplitude voltages that are a measure of the temperature variations to which the thermocouple is subjected. For the purpose of the present disclosure, the invention will be illustrated and described with particular reference to its adaptation to this method, but it is to be understood that the invention is not thus limited.

The problem of amplification of small alternating voltages presents little or no difficulty, the usual type of transformer or resistance coupled amplifiers serving the purpose in most instances. The amplification of low amplitude, unidirectional voltages, however, is considerably more difficult. Such voltages are encountered in the use of thermocouples, electrolytic devices, etc. One method of amplifying such voltages heretofore has been to mechanically interrupt the circuit by some form of commutator or like device and then to amplify the resulting interrupted current or voltage. The chief objection to this method is that the commutator or interrupting device will show wear and irregularity of contact, causing alteration of the voltage to be measured.

In accordance with the present invention, the unidirectional voltage to be amplified is combined with an alternating or oscillating voltage, which may be considered as a carrier, and the resultant voltage wave is amplified. The amplified voltage will vary with the low amplitude unidirectional voltage. Although the relation between these voltages is not exactly linear, it is such that the amplified voltage may, for all practical purposes, be regarded as a measure of the unidirectional voltage.

Figure 1:
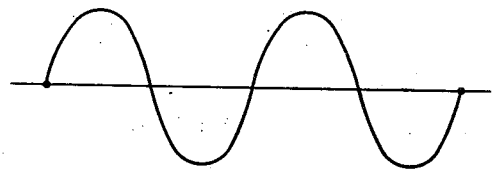
Figs. 1 to 7 are illustrative curves which serve to enable a clearer understanding of the invention.
Figure 2:

In Fig. 1, there is illustrated a pure sine wave. Suppose now that this wave is impressed upon some unilaterally conductive device so that the positive portion of the wave will be passed through the device and the negative portion will be suppressed. This will result in the wave shown in Fig. 2 which comprises a series of positive wave forms. If now this rectified wave is impressed upon the grid of a vacuum tube amplifier, there will be produced in the output of the amplifier a wave of substantially the same frequency as the original wave, but of approximately one-half of the amplitude of the fundamental.

Figure 3:
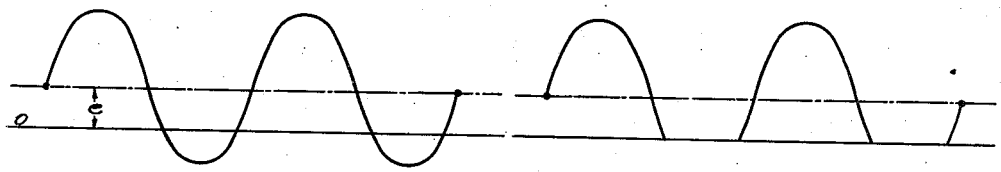
Figure 4:
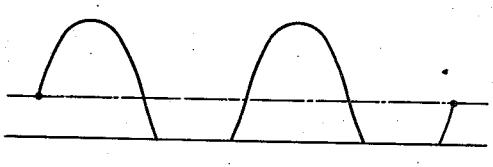

Suppose now that the unidirectional voltage to be amplified, or amplified and measured, is placed in series with the alternating or oscillating carrier wave, the resultant wave will be as shown in Fig. 3, the positive values all being increased by the value e and the negative parts of the cycle being decreased by the same amount. If this wave is impressed upon a unilaterally conductive device, the positive parts of the wave will be passed through the device as before and the negative parts suppressed. The wave admitted to the grid of the amplifier will be that shown in Fig. 4, which is similar to the wave of Fig. 2, but has a higher amplitude. This is caused by the fact that in the case illustrated in Fig. 3, there is more current flowing in the positive part of the cycle than in the negative part and only the latter part is suppressed. Therefore, it readily follows that the amplitude of the fundamental impressed upon the grid of the amplifier will vary from a value existing with no unidirectional bias voltage on the alternating carrier wave to a somewhat higher value existing when there is a unidirectional bias voltage on the carrier wave. Furthermore, this change in amplitude will be regular, though not necessarily linear, with the unidirectional voltage. Obviously, the same general phenomena will take place if the unilateral device is arranged to suppress the positive part of the cycle, the only difference being that the amplitude of the wave impressed on the amplifier will decrease with increase of unidirectional bias voltage. For some applications, this reversal may be desirable.

This simple explanation suffices if a perfectly unilaterally conductive device were available. Unfortunately, all such devices are only approximately so. Unilaterally conductive devices comprise certain crystals such as galena, carborundum, etc., the two electrode vacuum tube, and the copper-oxide rectifier. Crystals are not very satisfactory since too many factors influence the unilateral conductivity thereof, such as kind of contact, pressure, etc. The two electrode vacuum tube which is very satisfactory as a unilaterally conductive device for alternating voltages as high as three or four volts, shows only the most feeble differential conductivity with voltage amplitudes of some tenths of a volt.

Figure 5:
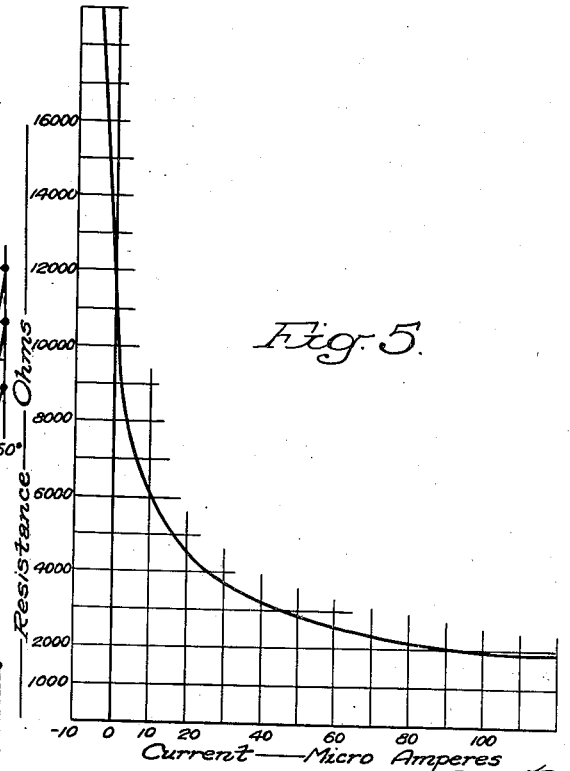

The copper-oxide rectifier of the form used for instruments intended for measurement of small alternating currents has been found quite satisfactory for the present purpose. While the copper-oxide rectifier, is not perfectly unilateral, it shows a considerable discrimination for currents as low as four or five microamperes. The curve shown in Fig. 5, represents the resistance of a copper-oxide rectifier unit, as a function of the current flowing through the unit. It will be seen that the resistance with negative currents increases very rapidly, as compared to the resistance with positive currents.

The use of such a copper-oxide rectifier unit in a circuit of the kind above mentioned is entirely practicable, and the theory of operation given above is only slightly changed. Obviously, in the actual case, complete suppression does not take place, and the waves shown in Figs. 2 and 4, would have some portions under the axis. There would, however, be a considerable discrimination in favor of the positive parts of the cycle, and as before, the amplitude of the fluctuating wave admitted to the grid of the amplifier would be varied in accordance with the unidirectional bias impressed upon the alternating carrier wave.

Although the copper-oxide rectifier has been found satisfactory it is possible that some other form of unilaterally conductive device may serve the purpose, and it is therefore to be understood that any such device may be used. Moreover, the words "rectifier" and "rectifying" as used herein and in the claims are to be understood as relating broadly to any device which shows suitable unilaterally conductive properties or a suitable difference in conductivity for currents or voltages of different direction or polarity.

Figure 6:
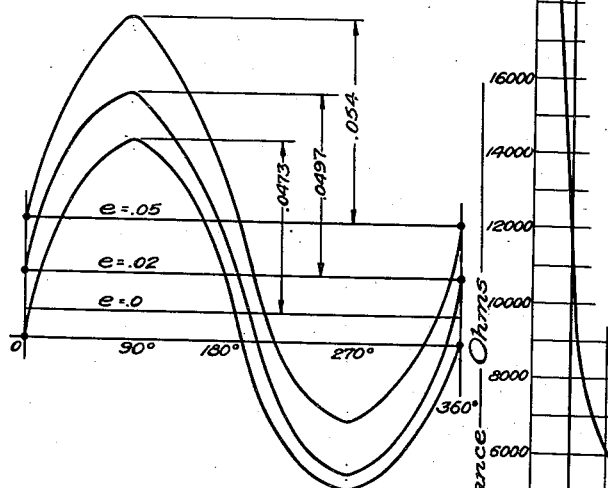

Fig. 6 shows the voltage waves actually admitted to the grid of an amplifier under certain specified conditions; namely, Amplitude of the alternating carrier wave=0.100 volts, Unidirectional bias voltage=0.00, .02 and 0.05.

It will be seen that the grid of the amplifier will receive a fundamental wave of amplitude 0.0473 with no unidirectional voltage on the grid, for the assumed value of grid coupling resistances. When the bias voltage is changed to 0.02 v., the center axis of the wave shifts upward, and the amplitude of the grid wave becomes 0.0497. Similarly for 0.05 volt unidirectional bias, the amplitude increases to 0.054. Thus for a change of 0.05 volt in the unidirectional voltage, the amplitude of the alternating voltage changed 0.0067 volt. However, this voltage can be amplified in a conventional vacuum tube amplifier, designed for alternating potentials, and so the problem of amplifying small unidirectional voltages has been solved.

Figure 8:
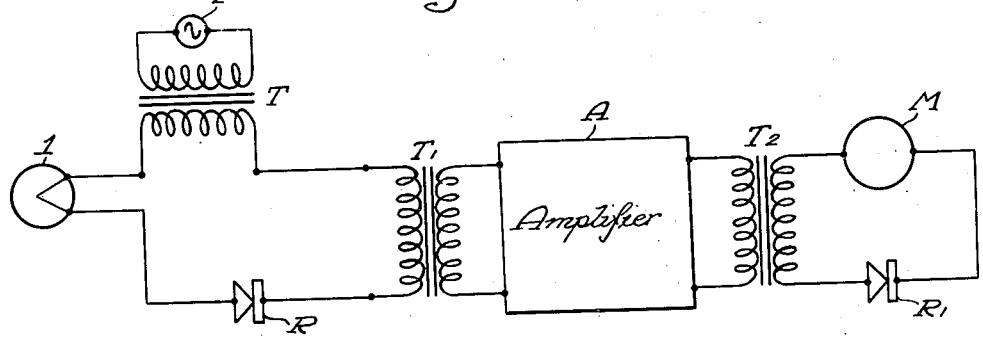
Fig. 8 is a schematic wiring diagram of a simple system embodying the principles of the invention.

A circuit arrangement for accomplishing this is shown in Fig. 8. In this figure, there is illustrated a thermocouple 1 which may be considered as a source of low amplitude, unidirectional voltage. It is assumed that the thermocouple is disposed so as to be subject to temperature variations which it is desired to measure in accordance with the conventional practice previously mentioned. A source of alternating or oscillating voltage 2 is inductively associated with the circuit of the thermocouple so as to set up an alternating voltage across the secondary of transformer T. This voltage, it will be noted is in series relation with the unidirectional voltage of the thermocouple. A rectifier R, which is preferably a copper-oxide rectifier, but may take any other suitable form, is also connected in series with the voltage sources. A transformer $T_1$ serves to couple the series circuit to a suitable amplifier A, which preferably comprises one or more conventional vacuum tube amplifiers. For the purpose of the present discussion, the amplifier may be considered as a simple three-electrode vacuum tube, the output current of which is controlled by voltages applied to the grid. The output circuit of the amplifier is coupled by means of transformer $T_2$ to a meter circuit which comprises a meter M and a rectifier $R_1$ in series relation. Rectifier $R_1$ may be a copper-oxide rectifier.

Let it be assumed that any one of the resultant voltage waves, shown in Fig. 6, is impressed upon amplifier A, the output of the amplifier will be indicated by the meter M, whose reading will be a measure of the voltage impressed on the grid of the amplifying tube, which, in turn, is a measure of the impressed unidirectional voltage. The meter may be calibrated to give any desired readings, in the case assumed it being desirable that the meter read directly the temperature causing the amplified voltages applied to the meter.

Figure 9:
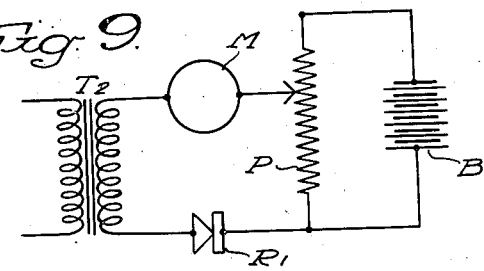
Fig. 9 is a similar diagram of a modified portion of the system.

In the system of Fig. 8, no provision is made to cause meter M to read zero when the value of the unidirectional voltage of source 1 is zero. In other words, the meter will respond to the rectified and amplified voltage derived from source 2 alone. In order to cause the meter to read zero when the unidirectional voltage is zero, the system may be modified as illustrated in Fig. 9. In this case, there is provided a source of unidirectional voltage which may take the form of a battery B and there is also provided a potentiometer P which is arranged so that varying potentials may be impressed upon meter M from source B. The potentiometer may be adjusted so that the voltage across the effective portion thereof is equal and opposite to the rectified voltage applied to the meter from source 2 alone. This will cause balancing or neutralizing of the voltage derived from source 2 and no resultant voltage will be applied to meter M when the unidirectional voltage of source 1 to zero. Thus, there will be no current flow through the meter at this time and it will read zero.

Figure 7:
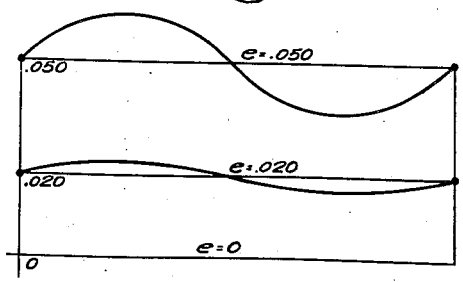
Figure 10:
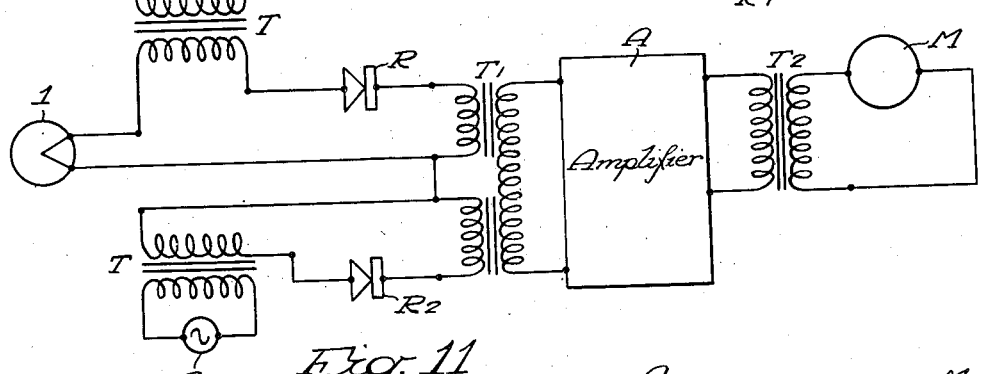
Fig. 10 is a similar diagram of a modified system.

A modified arrangement for accomplishing the desired purpose is illustrated in Fig. 10. In this case, instead of providing the zero shunt arrangement of Fig. 9, there is provided a second source of alternating or oscillating potential $2a$, the voltage of which is equal in frequency and amplitude to that of source 2. A rectifier $R_2$, which is similar to rectifier R and has similar characteristics, is connected in series relation with the secondary of transformer $T_3$ which serves to couple source $2a$ to the auxiliary mixing circuit. Transformer $T_1$ in this case has two primary windings which are included in the main and auxiliary mixing circuits, as illustrated. The primary windings are arranged so as to oppose each other so that when equal voltages of like phase are set up across these windings, they will neutralize each other and no voltage will be set up across the secondary of the transformer. When the unidirectional voltage of source 1 is zero in value, both mixing systems are impressing rectified voltage waves of like phase and opposite polarity on transformer $T_1$ and these waves neutralize each other, as above mentioned. If now the unidirectional voltage of source 1 assumes some value other than zero, the resultant voltage impressed upon transformer $T_1$ by the main mixing circuit will be no longer neutralized and a differential fluctuating voltage will be set up across the secondary of the transformer. Differential voltage waves for values of the unidirectional voltage of .02 volt and .05 volt are shown in Fig. 7. In this case, the amplifier amplifies the difference of the asymmetric alternating voltages, which difference is a measure of the impressed unidirectional voltage. This arrangement obviates the danger of overloading the amplifier and causes the reading of meter M to follow in accordance with the impressed unidirectional voltage.

Figure 11:
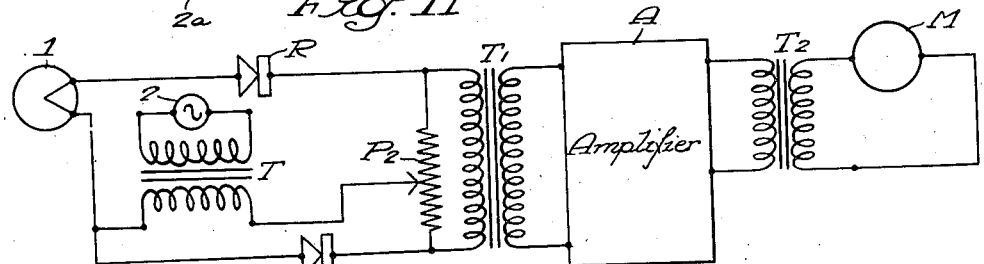
Fig. 11 is a similar diagram of a further modification.

In Fig. 11, there is shown a still further modification in which neutralizing voltages set up by the single source of alternating voltage 2 are utilized. In this case, the secondary winding of transformer T is in series with source 1 and rectifier R in the main mixing circuit, and is in series with rectifier $R_2$ in the auxiliary mixing circuit. In other words, the secondary winding is included in a common lead, as illustrated. A potentiometer or voltage divider $P_2$ is connected across the primary winding of transformer $T_1$ and opposing voltages are set up across the portions of the voltage divider on either side of the variable contact point.

In this instance, the potentiometer or voltage divider $P_2$ is adjusted so that when the voltage of source 1 is zero in value, the opposing voltages set up across the voltage divider are equal. These voltages neutralize each other and, as a result, there is no voltage impressed upon transformer $T_1$. When, however, the voltage of source 1 varies from zero value, the voltage set up across the upper portion of the voltage divider will not be neutralized by that across the lower portion and a resultant voltage will be impressed upon transformer $T_1$. This system accomplishes the same result as does the system of Fig. 10, but it is more desirable in that a single source of alternating voltage is used.

Figure 12:
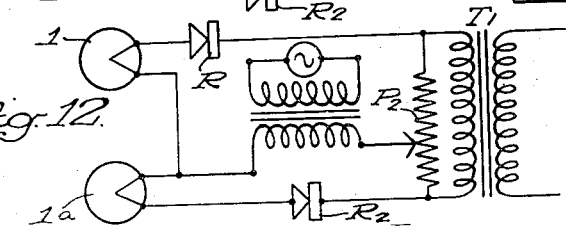
Fig. 12 is a partial diagram of a further modification.

In Fig. 12, there is shown a still further modification which is similar to the system of Fig. 11 but in which there is provided a thermocouple or other source of low amplitude, unidirectional voltage $1a$ in the auxiliary or second mixing circuit. This arrangement may be used where it is desired to obtain a fluctuating voltage corresponding to the sum or difference of two unidirectional voltages. In the case of temperature measurement, the sum or difference of two temperatures may be readily measured. If sources 1 and $1a$ are arranged so as to have like polarity, then a fluctuating voltage corresponding to the difference of the voltages of these sources will be produced. If, however, the polarities of sources 1 and $1a$ are unlike, then the fluctuating voltage produced will correspond to the sum of the voltages of these sources.

It will be noted that the method and apparatus disclosed herein functions to produce a fluctuating voltage corresponding to a unidirectional voltage or to the sum or difference of two unidirectional voltages irrespective of the use to which the fluctuating voltage may be put. This may be useful in other instances than where it is desired to amplify or amplify and measure a unidirectional voltage or voltages. As to the measurement of voltages, it is conceivable that it might be desirable and practical in some instances to measure the fluctuating voltage produced without prior amplification thereof. For example, it might be that a meter is available which will respond satisfactorily to the fluctuating voltage without amplification thereof. It is to be understood then that the invention is not limited to the specifically disclosed systems. It is also to be understood that the invention is not limited to any particular frequency. Although audio frequency transformers are illustrated and it has been found that audio frequencies give satisfactory results, it is within the scope of the invention to use any desired frequency and any mode of coupling of the various parts of the circuit.

It is recognized that the inductance of the input transformer of the systems above described will cause phase shifts in the voltage waves applied to the amplifier but this will not materially alter the principle set forth herein, and it is possible, notwithstanding this fact, to obtain a reading of the meter as a measure of the small unidirectional voltage. While several systems have been illustrated and described, it will be obvious that other arrangements and modifications are possible while still practicing the invention. Any such changes as fall within the scope of the appended claims are, therefore, deemed to be within the scope of the invention.

We claim:

1. In an electrical system, a source of unidirectional voltage, a source of oscillating or alternating voltage, and means for superimposing said unidirectional voltage upon said oscillating or alternating voltage to produce a fluctuating voltage corresponding to said unidirectional voltage.

2. In an electrical system, a source of unidirectional voltage, a source of oscillating or alternating voltage, means for superimposing said unidirectional voltage upon said oscillating or alternating voltage, and means for rectifying the current resulting from the combined voltages to produce a fluctuating voltage corresponding to said unidirectional voltage.

3. In a system for amplifying a low amplitude, unidirectional voltage, a source of oscillating or alternating voltage, means for superimposing said unidirectional voltage upon said oscillating or alternating voltage to produce a fluctuating voltage corresponding to said unidirectional voltage, and means for amplifying said fluctuating voltage.

4. In a system for amplifying a low amplitude, unidirectional voltage, a source of oscillating or alternating voltage, means for superimposing said unidirectional voltage upon said oscillating or alternating voltage, means for rectifying the current resulting from the combined voltages to produce a fluctuating voltage, and means for amplifying said fluctuating voltage.

5. In a system for measuring a low amplitude, unidirectional voltage, a source of oscillating or alternating voltage, means for combining the oscillating or alternating voltage with said unidirectional voltage, means for rectifying the current resulting from the combined voltages to produce a fluctuating voltage, and means for measuring said fluctuating voltage.

6. In a system for measuring a low amplitude, unidirectional voltage, a source of oscillating or alternating voltage, means for combining the oscillating or alternating voltage with said unidirectional voltage, means for rectifying the current resulting from the combined voltages to produce a fluctuating voltage, amplifying means, means for impressing said fluctuating voltage on said amplifying means, and means for measuring the output of said amplifying means.

7. In a system of the class described, a source of low amplitude, unidirectional voltage, a source of oscillating or alternating voltage, means for combining the oscillating or alternating voltage with said unidirectional voltage, means for rectifying the current resulting from the combined voltages to produce a fluctuating voltage, amplifying means, means for impressing said fluctuating voltage on said amplifying means, means for measuring the output of said amplifying means, and means for preventing current flow through said measuring means when the value of said unidirectional voltage is zero.

8. In a system of the class described, a source of low amplitude, unidirectional voltage, a source of oscillating or alternating voltage, means for combining the oscillating or alternating voltage with said unidirectional voltage, means for rectifying the current resulting from the combined voltages to produce a fluctuating voltage, means for producing and opposing to said fluctuating voltage a fluctuating voltage of substantially the same amplitude and frequency as the component of said first fluctuating voltage derived from said oscillating voltage, amplifying means, and means for impressing the resultant of said fluctuating voltages on said amplifying means.

9. In a system of the class described, a source of low amplitude, unidirectional voltage, a source of oscillating or alternating voltage, means for combining the oscillating or alternating voltage with said unidirectional voltage, means for rectifying the current resulting from the combined voltages to produce a fluctuating voltage, means for producing and opposing to said fluctuating voltage a fluctuating voltage of substantially the same amplitude and frequency as the component of said first fluctuating voltage derived from said oscillating voltage, amplifying means, means for impressing the resultant of said fluctuating voltages on said amplifying means, and means for measuring the output of said amplifying means.

10. In a system of the class described, a plurality of sources of low amplitude, unidirectional voltage, means for producing and combining an oscillating or alternating voltage with each of said unidirectional voltages, means for rectifying the currents resulting from the combined voltages to produce a plurality of fluctuating voltages, means for opposing said fluctuating voltages one to another, and means for amplifying the resultant of said fluctuating voltages.

11. In a system of the class described, a plurality of sources of low amplitude, unidirectional voltage, means for producing and combining an oscillating or alternating voltage with each of said unidirectional voltages, means for rectifying the currents resulting from the combined voltages to produce a plurality of fluctuating voltages, means for opposing said fluctuating voltages one to another, means for amplifying the resultant of said fluctuating voltages, and means for measuring the amplified resultant.

JOSEPH RAZEK.
PETER J. MULDER.